United States Patent
Dai et al.

(10) Patent No.: US 10,068,570 B2
(45) Date of Patent: Sep. 4, 2018

(54) METHOD OF VOICE RECOGNITION AND ELECTRONIC APPARATUS

(71) Applicants: Beijing Lenovo Software Ltd., Haidian District, Beijing (CN); Lenovo (Beijing) Co., Ltd., Haidian District, Beijing (CN)

(72) Inventors: Haisheng Dai, Beijing (CN); Qianying Wang, Beijing (CN); Hao Wang, Beijing (CN)

(73) Assignees: BEIJING LENOVO SOFTWARE LTD, Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 537 days.

(21) Appl. No.: 14/101,961

(22) Filed: Dec. 10, 2013

(65) Prior Publication Data
US 2014/0163984 A1    Jun. 12, 2014

(30) Foreign Application Priority Data
Dec. 10, 2012   (CN) .......................... 2012 1 0529658

(51) Int. Cl.
*G06F 15/00* (2006.01)
*G10L 15/04* (2013.01)
(Continued)

(52) U.S. Cl.
CPC .............. *G10L 15/22* (2013.01); *G10L 15/04* (2013.01); *G10L 15/08* (2013.01); *G10L 25/87* (2013.01)

(58) Field of Classification Search
None
See application file for complete search history.

(56) References Cited

U.S. PATENT DOCUMENTS 7,203,652 B1 *  4/2007  Heck ...................... G10L 15/32
                                                        704/231
7,444,285 B2 * 10/2008  Forbes .................... G10L 15/26
                                                        379/88.01
(Continued)

FOREIGN PATENT DOCUMENTS

CN       101464896 A       6/2009
CN       103366742 A      10/2013

OTHER PUBLICATIONS

First Office Action dated Apr. 28, 2016 out of Chinese Patent Application No. 201210529658.2 (12 pages including English translation).

*Primary Examiner* — Richemond Dorvil
*Assistant Examiner* — Thuykhanh Le
(74) *Attorney, Agent, or Firm* — Brinks Gilson & Lione; John C. Freeman

(57) ABSTRACT

A method of voice recognition and an electronic apparatus are described with the method of voice recognition being applied in an electronic apparatus. The method includes taking i=1 and detecting corresponding i-th voice sub-information at a moment Ti when the electronic apparatus detects that a user starts to talk at a moment T0, wherein the i-th voice sub-information voice information from the moment T0 to the moment Ti, the i-th voice sub-information is partial voice information of voice information with integral semantic corresponding to a moment Tj after the moment T0 to the moment Ti, and i is an integer greater than or equal to 1; and analyzing the i-th voice sub-information to obtain M results of analysis, M being an integer greater than or equal to 1.

18 Claims, 1 Drawing Sheet

(51) Int. Cl.
*G10L 15/08* (2006.01)
*G10L 15/22* (2006.01)
*G10L 15/26* (2006.01)
*G10L 17/00* (2013.01)
*G10L 25/87* (2013.01)

(56) References Cited

U.S. PATENT DOCUMENTS

| | | | | |
|---|---|---|---|---|
| 7,761,293 | B2* | 7/2010 | Tran | G06Q 30/0209 704/231 |
| 7,890,329 | B2* | 2/2011 | Wu | G06F 17/20 704/231 |
| 8,954,333 | B2* | 2/2015 | Chino | G10L 15/1822 704/270 |
| 2002/0138265 | A1* | 9/2002 | Stevens | G10L 15/22 704/251 |
| 2004/0078202 | A1* | 4/2004 | Kamiya | G10L 15/30 704/275 |
| 2005/0186988 | A1* | 8/2005 | Lim | H04N 1/00281 455/557 |
| 2005/0187767 | A1* | 8/2005 | Godden | G10L 15/08 704/238 |
| 2007/0050191 | A1* | 3/2007 | Weider | G06F 17/30864 704/275 |
| 2007/0073540 | A1* | 3/2007 | Hirakawa | G10L 15/22 704/252 |
| 2008/0052073 | A1* | 2/2008 | Goto | G10L 15/06 704/251 |
| 2008/0114603 | A1* | 5/2008 | Desrochers | G10L 15/22 704/275 |
| 2008/0140416 | A1* | 6/2008 | Shostak | H04W 4/04 704/270.1 |
| 2008/0208597 | A1* | 8/2008 | Chino | G10L 15/1822 704/277 |
| 2008/0270128 | A1* | 10/2008 | Lee | G06F 3/16 704/235 |
| 2009/0228273 | A1* | 9/2009 | Wang | G06F 3/04883 704/235 |
| 2009/0228274 | A1* | 9/2009 | Terrell, II | G10L 15/22 704/235 |
| 2009/0254351 | A1* | 10/2009 | Shin | G06F 3/167 704/275 |
| 2009/0326944 | A1* | 12/2009 | Yano | G10L 15/22 704/246 |
| 2011/0112837 | A1* | 5/2011 | Kurki-Suonio | G10L 15/22 704/235 |
| 2011/0184730 | A1* | 7/2011 | LeBeau | G10L 15/30 704/201 |
| 2013/0021459 | A1* | 1/2013 | Vasilieff | G10L 25/78 348/77 |
| 2013/0035936 | A1* | 2/2013 | Garland | G10L 15/26 704/235 |
| 2013/0246041 | A1* | 9/2013 | Costa | G06F 17/289 704/2 |
| 2013/0253933 | A1* | 9/2013 | Maruta | G10L 15/00 704/246 |
| 2014/0156279 | A1* | 6/2014 | Okamoto | G10L 15/18 704/257 |

* cited by examiner

METHOD OF VOICE RECOGNITION AND ELECTRONIC APPARATUS

BACKGROUND

This application claims priority to Chinese patent application No. 201210529658.2 filed on Dec. 10, 2012, the entire contents of which are incorporated herein by reference.

The present application relates to the field of multimedia technology, and particularly to a method of voice recognition and an electronic apparatus.

With the global development of information technology, electronic apparatus product has already entered human life completely. Many electronic apparatus products, such as a notebook computer, a mobile phone, a PAD or the like, become widespread tools because they have a characteristic of portability, and bring more and more convenience to the user.

And, with the development of the electronic apparatus, more and more input modes are generated, here, the mode of voice input gets welcome of more and more users due to the fastness and convenience of this input mode. In the prior arts, generally, when a voice recognition system detects that there is voice input information, it generally determines whether the voice input information is inputted completely or whether there is a pause of a relatively long period, and then recognize the acquired voice information and acquire a recognition result therefrom.

The inventor of this application has found at least the following technical problems in the prior arts in the procedure of implementing the technical solutions of the embodiments of this application:

Since in the prior arts, when the voice recognition system determines that the voice input information is inputted completely or there is a pause of s relatively long period, it analyzes the voice input information so as to obtain a result of voice recognition, thus, there is a technical problem that the recognition of the voice recognition system to the voice information is not in time adequately in the prior art.

SUMMARY

The embodiments of the present application provide a method of voice recognition and an electronic apparatus for solving the technical problem that the recognition of the voice recognition system to the voice information is not in time adequately in the prior art.

In an aspect, one embodiment of this application provides the following technical solution:

A method of voice recognition applied in an electronic apparatus, the method including:

When the electronic apparatus detects that a user starts to talk at a moment T0, taking i=1, and detecting corresponding i-th voice sub-information at a moment Ti, wherein the i-th voice sub-information is corresponding voice information from the moment T0 to the moment Ti, the i-th voice sub-information is partial voice information of voice information with integral semantic corresponding to a moment Tj after the moment T0 to the moment Ti, and i is an integer greater than or equal to 1; and Analyzing the i-th voice sub-information to obtain M results of analysis, and M is an integer greater than or equal to 1.

Optionally, analyzing the i-th voice sub-information to obtain M results of analysis is specifically:

Analyzing the i-th voice sub-information to obtain M keyword text information, the M keyword text information being exactly the M results of analysis.

Optionally, analyzing the i-th voice sub-information to obtain M results of analysis specifically includes:

Analyzing the i-th voice sub-information to obtain N keyword text information, wherein N is an integer greater than or equal to 1; and Obtaining M results of matching whose match degree with any of the N keyword text information is larger than a first preset threshold based on the N keyword text information, the M results of matching being exactly the M results of analysis.

Optionally, after analyzing the i-th voice sub-information to obtain M results of analysis, the method further includes:

Displaying M1 results of analysis in the M results of analysis on a display interface to receive a selection instruction of the user, wherein M1 is an integer greater than or equal to 1.

Optionally, after analyzing the i-th voice sub-information to obtain M results of analysis, the method further includes:

Deciding whether there is a first control instruction for stopping detecting whether the user is talking;

Stopping detecting whether the user is talking when there is the first control instruction; and Taking i=i+1 and executing a step of detecting the corresponding i-th voice sub-information at a moment Ti when there is no first control instruction.

Optionally, deciding whether there is a first control instruction for stopping detecting whether the user is talking specifically includes:

Deciding whether there is a selection operation of selecting a first result of analysis in the M1 results of analysis to obtain a result of decision;

Wherein, when the result of decision indicates that there is the selection operation, a first control instruction is generated.

Optionally, the selection operation is specifically an operation carried out through a first input mode, wherein the first input mode is an input mode different from the voice input mode.

Optionally, before displaying the M1 results of analysis in the M results of analysis on the display interface, the method further includes:

Scoring the M results of analysis according to the match degree to obtain M first point values; or Scoring the M results of analysis according to the historical selection information to obtain M second point values; or Scoring the M results of analysis according to the match degree and the historical selection information to obtain M third point values.

Optionally, displaying the M1 results of analysis in the M results of analysis on the display interface specifically includes:

Acquiring M1 results of analysis having the highest point value among the first point values, the second point values, or the third point values from the M results of analysis; and Displaying the M1 results of analysis on the display interface.

Optionally, analyzing the i-th voice sub-information to obtain M results of analysis is specifically:

Carrying out voiceprint analysis to the i-th voice sub-information to obtain the M results of analysis.

In another aspect, another embodiment of this application provides the following technical solution:

An electronic apparatus including:

A detecting chip for taking i=1 and detecting corresponding i-th voice sub-information at a moment Ti when the electronic apparatus detects that a user starts to talk at a moment T0, wherein the i-th voice sub-information is corresponding voice information from the moment T0 to the moment Ti, the i-th voice sub-information is partial voice information of voice information with integral semantic corresponding to a moment Tj after the moment T0 to the moment Ti, and i is an integer greater than or equal to 1; and An analyzing chip for analyzing the i-th voice sub-information to obtain M results of analysis, M being an integer greater than or equal to 1.

Optionally, the analyzing chip is specifically for:

Analyzing the i-th voice sub-information to obtain M keyword text information, the M keyword text information being exactly the M results of analysis.

Optionally, the analyzing chip specifically includes:

An analyzing sub-chip for analyzing the i-th voice sub-information to obtain N keyword text information, wherein N is an integer greater than or equal to 1; and A matching sub-chip for obtaining M results of matching whose match degree with any of the N keyword text information is larger than a first preset threshold based on the N keyword text information, the M results of matching being exactly the M results of analysis.

Optionally, the electronic apparatus further includes:

A displaying chip for displaying the M1 results of analysis in the M results of analysis on a display interface to receive a selection instruction of the user after analyzing the i-th voice sub-information to obtain the M results of analysis, wherein M1 is an integer greater than or equal to 1.

Optionally, the electronic apparatus further includes:

A deciding chip for deciding whether there is a first control instruction for stopping detecting whether the user is talking after analyzing the i-th voice sub-information to obtain the M results of analysis;

A stopping chip for stopping detecting whether the user is talking when there is the first control instruction; and A returning chip for taking i=i+1 and executing a step of detecting the corresponding i-th voice sub-information at a moment Ti when there is no first control instruction.

Optionally, the deciding chip specifically includes:

A deciding sub-chip for deciding whether there is a selection operation of selecting a first result of analysis in the M1 results of analysis to obtain a result of decision; and A generating sub-chip for generating the first control instruction when the result of decision indicates that there is the selection operation.

Optionally, the selection operation is specifically an operation carried out through a first input mode, wherein the first input mode is an input mode different from the voice input mode.

Optionally, the electronic apparatus further includes:

A scoring chip for scoring the M results of analysis according to the match degree to obtain M first point values before displaying the M1 results of analysis in the M results of analysis on the display interface; or Scoring the M results of analysis according to the historical selection information to obtain M second point values; or Scoring the M results of analysis according to the match degree and the historical selection information to obtain M third point values.

Optionally, the displaying chip specifically includes:

An acquiring sub-chip for acquiring M1 results of analysis having the highest point value among the first point values, the second point values, or the third point values from the M results of analysis; and A displaying sub-chip for displaying the M1 results of analysis on the display interface.

Optionally, the analyzing chip is specifically for:

Carrying out voiceprint analysis to the i-th voice sub-information to obtain the M results of analysis.

One or more technical solutions provided by the embodiments of this application at least have the following technical effects or advantages:

(11) Since in the embodiments of this application, a technical solution in which when the electronic apparatus detects that the user starts to talk, partial voice information corresponding to voice information with integral semantic of the user is detected and the partial voice information is analyzed to obtain M results of analysis is adopted, because there is no need to acquire voice information with integral semantic to analyze the voice information, it solves the technical problem that the recognition of the voice information is not in time adequately in the prior art, and achieves a technical effect of recognizing the voice information in time.

(2) Since in the embodiments of this application, detecting voice information of the user is stopped when there is the first control instruction for stopping detecting whether the user is talking, it achieves a technical effect of saving power consumption for detecting and analyzing the voice information.

(3) Since in the embodiments of this application, it determines whether to generate the first control instruction by deciding whether there is the selection operation selecting a first processing object in M processing objects of the user, and generally, after the user selects the first processing object, it indicates that the electronic apparatus has already recognized the control instruction needed by the user, thus, detecting the voice information is stopped in this case, which achieves a technical effect of saving power consumption while recognizing the voice information accurately.

(4) Since in the embodiments of this application, a technical solution in which the M results of analysis are scored and the M1 results of analysis with the highest point values are displayed is adopted, wherein higher point value indicates that the match degree is relatively high in general situations, thus, it achieves a technical effect of increasing accuracy of the voice recognition.

(5) Since in the embodiments of this application, a technical solution in which the selection operation is carried out through a first input mode different from the voice input mode is adopted, it achieves a technical effect of increasing accuracy and velocity of the selection operation.

DETAILED DESCRIPTION

The embodiments of the present application provide a method of voice recognition and an electronic apparatus for solving the technical problem that the recognition of the voice recognition system to the voice information is not in time adequately in the prior art.

The overall concept of the technical solutions in the embodiments of this application for solving the above technical problem is as follows:

When the electronic apparatus detects that the user starts to talk at a moment T 0, corresponding i-th voice sub-information at a moment Ti of the electronic apparatus is detected, wherein the i-th voice sub-information is partial voice information of voice information with integral semantic corresponding to a moment Tj after the moment T0 to the moment Ti. And then, the i-th voice information is analyzed to obtain M results of analysis, the results of analysis may be a corresponding voice control instruction, and then, the M results of analysis are provided to the user to be selected, if the user selects a first result of analysis among others, the voice recognition is stopped, and if the user does not select any of the results of analysis among them, the voice information is detected continuously to be analyzed.

Since when the above-described solution is adopted to carry out voice recognition, there is no need to acquire voice information with integral semantic to analyze the voice information and it achieves a technical effect of recognizing the voice information in time.

For understanding the above-described technical solution better, the above-described technical solution is explained detailed in combination with the accompanying drawings of the specification and the specific implementation modes.

First Embodiment

The first embodiment of this application provides a method of voice recognition applied in an electronic apparatus, the electronic apparatus is for example a notebook computer, a mobile phone, a tablet computer or the like.

Figure 1:
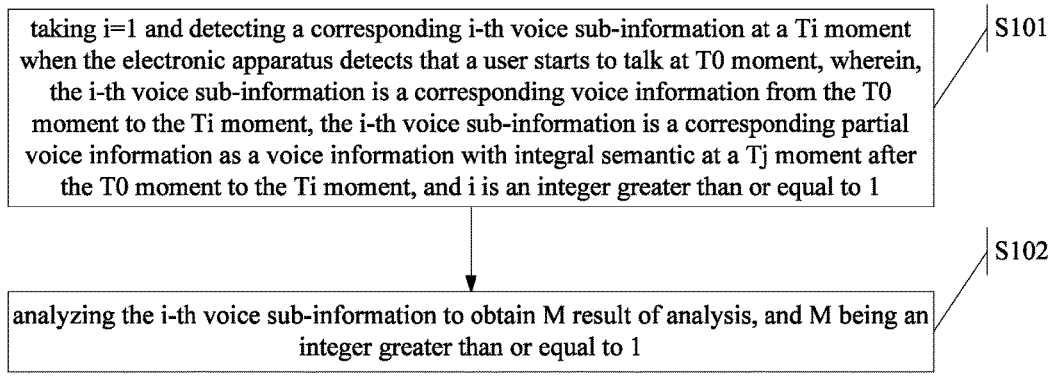
FIG. 1 is a flow chart of the method of voice recognition in the first embodiment of this application.

With reference to FIG. 1, the method of voice recognition includes the following steps:

Step S101: taking i=1 and detecting corresponding i-th voice sub-information at a moment Ti when the electronic apparatus detects that a user starts to talk at a moment T0, wherein the i-th voice sub-information is corresponding voice information from the moment T0 to the moment Ti, the i-th voice sub-information is partial voice information of voice information with integral semantic corresponding to a moment Tj after the moment T0 to the moment Ti, and i is an integer greater than or equal to 1;

Step S102: analyzing the i-th voice sub-information to obtain M results of analysis, and M is an integer greater than or equal to 1.

Wherein, in step S101, the microphone of the electronic apparatus is in an ON status to detect whether there is a user talking, so as to carry out a voice input operation, wherein content corresponding to the voice operation can be various content, for example:

(1) inputting a voice instruction, the voice instruction is for example opening a word document, opening a fly dive application or the like;

(2) inputting a search keyword, the search keyword is for example: antenna system, electronic apparatus or the like;

(3) inputting a piece of text, for example: "go shopping with xxx on sunday", "with the development of social information . . . ", and so on.

Of course, in the specific implementation procedure, the content corresponding to the voice operation can be various content and is not limited to the above three kinds, the embodiment of this application no longer itemizes and does not make any limitation thereto.

Wherein, the moment T0 is a time at which the electronic apparatus detects that the user starts to input a piece of voice information, and the moment Tj is a time at which the user stops inputting the voice information, Ti is any time between T0 and Tj.

In the specific implementation procedure, the i-th voice sub-information can be detected every preset time interval, the preset time interval is for example 2 s, 3 s, 5 s or the like, and then each time the voice sub-information is detected, it is recognized based on step S102; or, a plurality of points of time are set, and the voice sub-information is started to be detected when the set point of time is reached, the plurality of points of time can be counted with moment T0 as a 0 moment, of course, other manners of counting can be adopted, this application does not make any limitation thereto.

Wherein, in step S102, analyzing the i-th voice sub-information to obtain M results of analysis is specifically:

Carrying out voiceprint analysis to the i-th voice sub-information to obtain the M results of analysis.

Generally, in carrying out voiceprint analysis to the i-th voice sub-information, characteristic information corresponding thereto, for example, acoustics characteristic, lexical characteristics, rhythm characteristic or the like needs to be extracted from the i-th voice sub-information firstly, and then, said characteristic information is matched with a pre-established acoustical model, and a plurality of match items with a degree of similarity larger than a preset threshold are acquired therefrom, so as to acquire the M results of analysis through the plurality of match items.

Wherein, based on the difference of the M results of analysis, in step S102, the procedures of analyzing the i-th voice sub-information to obtain the M results of analysis are also different, two kinds of them are enumerated to be introduced hereinafter, of course, in the specific implementation procedure, it is not limited to the following two kinds of cases.

The first kind is analyzing the i-th voice sub-information to obtain M keyword text information, the M keyword text information being exactly the M results of analysis.

In the specific implementation procedure, after carrying out voiceprint recognition to the i-th voice sub-information, a plurality of keyword text information is obtained according to the match degree thereof, assuming that the following keyword text information is obtained by analyzing the i-th voice sub-information:

| Related word | Degree of similarity (%) |
|---|---|
| Electronic book | 99% |
| Electronic beam | 90% |
| Electronic lock | 70% |
| Idea book | 60% |

Then, the obtained plurality of keyword text information is exactly the M results of analysis.

The second kind specifically includes the following steps:

Analyzing the i-th voice sub-information to obtain N keyword text information, wherein N is an integer greater than or equal to 1;

Obtaining M results of matching whose match degree with any of the N keyword text information is larger than a first preset threshold based on the N keyword text information, the M results of matching being exactly the M results of analysis.

In the specific implementation procedure, in the second kind of method, the procedure of analyzing the i-th voice sub-information to obtain N keyword text information is similar to that in the first kind of method, thus, it is no longer described detailed herein, and assuming that one piece of keyword text information of xx Guo is obtained, of course, it can be other keyword information, for example, 2012, fly shield of dragon gate, and so on.

Then, M results of matching with the highest match degree are acquired from a plurality of hotspot information with the keyword as "xx Guo", wherein the match degree can be represented by a clicking rate, an influence degree or the like, of course, it can be represented by using other manners, wherein the higher the clicking rate is, it indicates that the match degree is higher, assuming that the match is carried out by taking the keyword as "xx Guo", then a result of matching shown in the following table is obtained:

| Result of matching | Clicking rate |
| --- | --- |
| Reported that xx Guo blocks fans at micro-blog | 10000 |
| Newest comic dialog at X2012 of xx Guo | 8000 |
| Single comic dialog of xx Guo | 6000 |
| Gangum style of xx Guo | 4000 |

The above-described plurality of results of matching is exactly the M results of analysis.

Further, in the specific implementation procedure, after obtaining the M results of analysis, the M results of analysis can be scored, wherein they can be scored by using many ways, three kinds of ways among others are enumerated to be introduced, of course, in the specific implementation procedure, it is not limited to the following three kinds of ways.

The first kind is scoring the M results of analysis according to the match degree to obtain M first point values;

By taking the M results of analysis as M keyword text information as example, in the specific implementation procedure, degree of similarity and match degree may be provided with a correspondence relationship, for example, match degree=degree of similarity/10, of course, there can be other correspondence relationship, then the corresponding match degree can be obtained based on the above corresponding value of degree of similarity, it is specifically as follows:

| Related word | Match degree |
| --- | --- |
| Electronic book | 9.9 |
| Electronic beam | 9 |
| Electronic lock | 7 |
| Idea book | 6 |

The second kind is scoring the M results of analysis according to the historical selection information to obtain M second point values;

Taking the M results of analysis as M keyword information as example, in the specific implementation procedure, all of the historical selection information of the results of analysis can be set to 0, of course, they can be set to other values, for example, 10, 100 or the like, then, after each time of voice recognition, if the user makes a selection thereto, the point value thereof is increased by 1, of course, it can be increased by other values, for example, 0.5, 1, 3 or the like. And, if the user does not make a selection thereto for n times continuously, wherein n is an arbitrary value, for example, 3, 5, 10 or the like, then, the point value thereof is decreased by 1, of course, it can be decreased by other values, for example, 1, 3, 10 or the like.

Assuming that n is 5, and in the 6 times of selection, "electronic beam" is selected 3 times, "electronic lock" is selected 2 times, "idea book" is selected 1 time, and "electronic book" is selected 0 time, then the corresponding point values thereto are respectively as follows:

| Related word | Historical selection point value |
| --- | --- |
| Electronic book | 8.9 |
| Electronic beam | 12 |
| Electronic lock | 9 |
| Idea book | 6 |

The third kind is scoring the M results of analysis according to the match degree and the historical selection information to obtain M third point values.

In the specific implementation procedure, the third point values can be obtained by adding the match degree and the historical selection point value directly according to a certain proportion, or the third point values are obtained by multiplication or adopting other manners, the embodiment of this application does not make any limitation on how to obtain the third point values.

Taking the match degree being the match degree obtained previously and the historical selection point value being the historical selection point value obtained previously as example, wherein the ratio of the match degree and the historical selection point value is 1:1, then a following table of the third point values can be obtained:

| Related word | Historical selection point value |
| --- | --- |
| Electronic book | −1 |
| Electronic beam | 3 |
| Electronic lock | 2 |
| Idea book | 0 |

The following operation can be carried out after obtaining the M results of analysis:

Displaying M1 results of analysis in the M results of analysis on a display interface to receive a selection instruction of the user, wherein M1 is an integer greater than or equal to 1.

In the specific implementation procedure, all of the M results of analysis can be displayed on the display interface, in this case, M is equal to M1; however, in some cases, due to the limitation of the size of the display interface, it may not able to display the M results of analysis completely, and in this case, M1 is less than M.

In the specific implementation procedure, the M results of analysis can be obtained by adopting many kinds of ways, two kinds among others are enumerated hereinafter to be introduced, of course, in the specific implementation procedure, and it is not limited to the following two kinds of cases.

The first kind is acquiring M1 results of analysis from the M results of analysis according to a precedence order of acquisition, for example, the precedence order of acquisition of the four results of analysis of "electronic book", "electronic beam", "electronic lock" and "idea book" is "idea book", "electronic lock", "electronic beam" and "electronic book", and M1 is equal to 2, of course, M1 may be other value, for example, 1, 3, 5 or the like, thus, the two related word "idea book" and "electronic lock" with the earliest time of acquisition are displayed on the display interface.

The second kind is acquiring M1 display results with the highest point value from the M results of analysis and then displaying them on the display interface.

In the specific implementation procedure, the point value may be the first point value, the second point value or the third point value, of course, it may be other point values, and the embodiment of this application does not make any limitation thereto.

Taking the point value being the first point value and M1 being 2 as example, then, the two related words displayed on the display interface should be "electronic book" and "electronic beam";

And if the point value is the second point value and M1 is 2, then, the two related words displayed on the display interface should be "electronic beam" and "electronic lock";

And if the point value is the third point value and M1 is 2, then, the two related words displayed on the display interface should be "electronic beam" and "electronic lock";

Of course, based on different application environments, the M1 results of analysis displayed on the display interface may be other results of analysis, the embodiment of this application no longer describes detailed and does not make any limitation thereto.

It is understood from the above description that, since in the embodiment of this application, a technical solution in which the M results of analysis are scored and the M1 results of analysis with the highest point values are displayed is adopted, wherein higher point value indicates that the match degree is relatively high in general situations, thus, it achieves a technical effect of increasing accuracy of the voice recognition.

After displaying the M1 results of analysis on the display interface, they are provided to the user to be carried out a selection operation.

Figure 2:
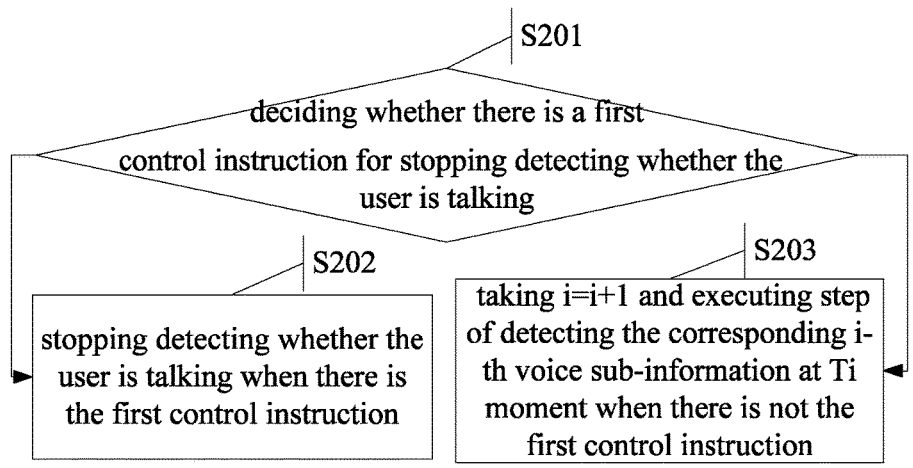
FIG. 2 is a flow chart of deciding whether there is a first control instruction for stopping detecting whether the user is talking in the method of the first embodiment of this application.

In the specific implementation procedure, after analyzing the i-th voice sub-information based on step S102 to obtain the M results of analysis, as shown in FIG. 2, the following operations may also be carried out:

Step S201: deciding whether there is a first control instruction for stopping detecting whether the user is talking;

Step S202: stopping detecting whether the user is talking when there is the first control instruction;

Step S203: taking 1=i+1 and executing a step of detecting the corresponding i-th voice sub-information at a moment Ti when there is no first control instruction.

Wherein, in step S201, whether there is the first control instruction for stopping detecting whether the user is talking can be decided by adopting many kinds of ways, two kinds among others are enumerated hereinafter to be introduced, of course, in the specific implementation procedure, it is not limited to the following two kinds of cases.

The first kind is deciding whether there is a selection operation of selecting a first result of analysis in the M1 results of analysis to obtain a result of decision;

The first control instruction is generated or not generated based on the result of decision, wherein when the result of decision indicates that there is the selection operation, the first control instruction is generated, and when the result of decision indicates that there is no selection operation, the first control instruction is not generated.

In the specific implementation procedure, when the purpose of the user inputting the voice information is to input a voice instruction or input a search keyword, after the user selects the first result of analysis, it indicates that the purpose of the user making voice input is achieved, and thus, it no longer needs to continue to detect the voice information, and thus the first control instruction is generated. And, if the user does not select any result of analysis, it indicates that none of the M results of analysis is wanted by the user, and thus it continues to detect and analyze the voice information, that is, it returns to step S101 and step S102.

It is understood from the above description that, since in the embodiment of this application, it determines whether to generate the first control instruction by deciding whether there is the selection operation selecting a first processing object in M processing objects of the user, and generally, after the user selects the first processing object, it indicates that the electronic apparatus has already recognized the control instruction needed by the user, thus, detecting the voice information is stopped in this case, which achieves a technical effect of saving power consumption while recognizing the voice information accurately.

In the specific implementation procedure, the selection operation may be an operation carried out by adopting any input mode, the input mode is for example a voice input mode, a keyboard input mode, a touch control panel input mode or the like, and the embodiment of this application does not make any limitation thereto.

Wherein, as a preferable embodiment, the selection operation is specifically an operation carried out through a first input mode, wherein the first input mode is an input mode different from the voice input mode.

In the specific implementation procedure, since the user is inputting data by voice, if the selection operation is carried out by adopting voice input mode, first, it is easy to cause the voice input system to get a wrong decision, i.e., it is unaware of that the voice input information next is a selection operation or is just a simple voice input; and the accuracy of the voice input is relatively low than other input modes; further, if the selection operation is carried out by adopting voice input mode, it needs to recognize the voice instruction again, which results in delay.

It is understood from the above description that, since in the embodiment of this application, a technical solution in which the selection operation is carried out through a first input mode different from the voice input mode is adopted, and it achieves a technical effect of increasing accuracy and velocity of the selection operation.

The second kind is deciding whether the user stops talking to obtain another result of decision;

Wherein, when the another result of decision indicates that the user stops talking, the first control instruction is generated, and when it indicates that the user does not stop talking, the first control instruction is not generated.

In the specific implementation procedure, when the user has already stopped talking, no matter whether the user selects the first result of analysis, since the procedure of the voice input is ended, the first control instruction is generated and detecting the voice information is stopped.

It is understood from the above description that, since in the embodiment of this application, detecting voice information of the user is stopped when there is the first control instruction for stopping detecting whether the user is talking, it achieves a technical effect of saving power consumption for detecting and analyzing the voice information.

Second Embodiment

In order for those skilled in the art to understand the specific implementation procedure of the method of voice recognition described in the first embodiment of this application, in the present embodiment, the specific implementation procedure of the method of voice recognition in first embodiment is described detailed at the user side. Wherein, it takes the electronic apparatus being the tablet computer as example.

At a moment T1 , a user A opens the tablet computer to carry out some operations.

At a moment T2, the user A initiates a browser of the tablet computer to search reading software of electronic apparatus, wherein the purpose of the user A is to acquire a electronic book reading software with free novels.

The user A turns on the microphone of the tablet computer and starts to make voice input, then after the tablet computer detects the voice input operation of the user, it sets the time of the timer to 0, which represents a moment T0.

After 3 seconds, a moment T1 is reached, the tablet computer detects that the userA inputs the following voice information "with free novel", then the tablet computer analyzes the voice information to obtain the following results of analysis: "free novel", "free small talk", then the results of analysis are displayed on the display screen of the tablet computer.

However, the user does not carry out any selection operation thereto, thus, the tablet computer continues to analyze the next voice information.

After 3 seconds, a moment T2 is reached, the tablet computer detects that the userA inputs the following voice information of "electronic book with free novel", then the tablet computer analyzes it to obtain the following results of analysis: "electronic book", "reading software of electronic book", "free novel", and these three results of analysis are displayed on the display interface of the tablet computer, and then the userA selects the "reading software of electronic book" among others, the tablet computer detects the selection operation of the user A and stops detecting the voice information, and adopts the "reading software of electronic book" as keyword to search.

Third Embodiment

Based on the same inventive concept, the third embodiment of this application provides an electronic apparatus, the electronic apparatus is for example a notebook computer. a mobile phone, a tablet computer or the like.

Figure 3:
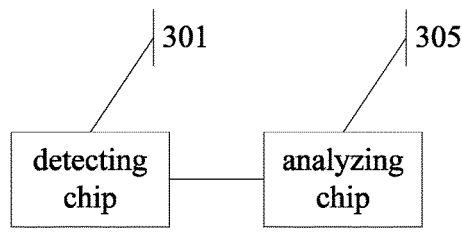
FIG. 3 is a structural diagram of the electronic apparatus in the third embodiment of this application.

With reference to FIG. 3, the electronic apparatus further includes the following structure:

A detecting chip 301 for taking i=1 and detecting corresponding i-th voice sub-information at a moment Ti when the electronic apparatus detects that a user starts to talk at a moment T0, wherein the i-th voice sub-information is corresponding voice information from the moment T0 to the moment Ti, the i-th voice sub-information is partial voice information of voice information with integral semantic corresponding to a moment Tj after the moment T0 to the moment Ti, and i is an integer greater than or equal to 1; and An analyzing chip 302 for analyzing the i-th voice sub-information to obtain M results of analysis, M being an integer greater than or equal to 1.

In the specific implementation procedure, the moment T0 is a time at which the electronic apparatus detects that the user starts to input a piece of voice information, and the moment Tj is a time at which the user stops inputting the voice information, Ti is any time between T0 and Tj.

The detecting chip 301 can detect the i-th voice sub-information every preset time interval; or it sets a plurality of points of time, and detects the i-th voice sub-information when each point of time is reached. The embodiment of this application does not make any limitation on when the i-th voice sub-information is detected.

In the specific implementation procedure, the analyzing chip 302 is specifically for:

Carrying out voiceprint analysis to the i-th voice sub-information to obtain the M results of analysis.

In the specific implementation procedure, the analyzing chip 302 is specifically for:

Analyzing the i-th voice sub-information to obtain M keyword text information, the M keyword text information being exactly the M results of analysis.

In the specific implementation procedure, the analyzing chip 302 specifically includes:

An analyzing sub-chip for analyzing the i-th voice sub-information to obtain N keyword text information, wherein N is an integer greater than or equal to 1; and A matching sub-chip for obtaining M results of matching whose match degree with any of the N keyword text information is larger than a first preset threshold based on the N keyword text information, the M results of matching being exactly the M results of analysis.

In the specific implementation procedure, the electronic apparatus further includes:

A scoring chip for scoring the M results of analysis according to the match degree to obtain M first point values before displaying the M1 results of analysis in the M results of analysis on the display interface; or Scoring the M results of analysis according to the historical selection information to obtain M second point values; or Scoring the M results of analysis according to the match degree and the historical selection information to obtain M third point values.

In the specific implementation procedure, the electronic apparatus further includes:

A displaying chip for displaying the M1 results of analysis in the M results of analysis on a display interface to receive a selection instruction of the user after analyzing the i-th voice sub-information to obtain the M results of analysis, wherein M1 is an integer greater than or equal to 1.

In the specific implementation procedure, the display chip can display the M results of analysis on the display interface by adopting many kinds of ways, two kinds among others are enumerated hereinafter to be introduced, of course, in the specific implementation procedure, and it is not limited to the following two kinds of cases.

The first kind is acquiring M1 results of analysis from the M results of analysis according to a precedence order of acquisition.

The second kind is the display chip specifically including:

An acquiring sub-chip for acquiring M1 results of analysis having the highest point value among the first point values, the second point values or the third point values from the M results of analysis; and A displaying sub-chip for displaying the M1 results of analysis on the display interface.

In particular, M1 results of analysis are acquired from the high point value to the low point value, and then the M1 results of analysis are displayed on the display interface.

It is understood from the above description that, since in the embodiment of this application, a technical solution in which the M results of analysis are scored and the M1 results of analysis with the highest point values are displayed is adopted, wherein higher point value indicates that the match degree is relatively high in general situations, thus, it achieves a technical effect of increasing accuracy of the voice recognition.

In the specific implementation procedure, the electronic apparatus further includes:

A deciding chip for deciding whether there is a first control instruction for stopping detecting whether the user is talking after analyzing the i-th voice sub-information to obtain the M results of analysis;

A stopping chip for stopping detecting whether the user is talking when there is the first control instruction; and A returning chip for taking i=i+1 and executing a step of detecting the corresponding i-th voice sub-information at a moment Ti when there is no first control instruction.

In the specific implementation procedure, the deciding chip can decide whether there is the first control instruction for stopping detecting whether the user is talking by adopting many kinds of ways, two kinds among others are enumerated hereinafter to be introduced, of course, in the specific implementation procedure, it is not limited to the following two kinds of cases.

The first kind is the deciding chip specifically including:

A deciding sub-chip for deciding whether there is a selection operation of selecting a first result of analysis in the M1 results of analysis to obtain a result of decision; and A generating sub-chip for generating or not generating the first control instruction based on the result of decision, wherein when the result of decision indicates that there is the selection operation, the first control instruction is generated, and when the result of decision indicates that there is no selection operation, the first control instruction is not generated.

In the specific implementation procedure, when the purpose of the user inputting the voice information is to input a voice instruction or input a search keyword, after the user selects the first result of analysis, it indicates that the purpose of the user making voice input is achieved, and thus, it no longer needs to continue to detect the voice information, and thus the first control instruction is generated. And, if the user does not select any result of analysis, it indicates that none of the M results of analysis is wanted by the user, and thus it continues to detect and analyze the voice information.

It is understood from the above description that, since in the embodiment of this application, it determines whether to generate the first control instruction by deciding whether there is the selection operation selecting a first processing object in M processing objects of the user, and generally, after the user selects the first processing object, it indicates that the electronic apparatus has already recognized the control instruction needed by the user, thus, detecting the voice information is stopped in this case, which achieves a technical effect of saving power consumption while recognizing the voice information accurately.

In the specific implementation procedure, the selection operation is specifically an operation carried out through a first input mode, wherein the first input mode is an input mode different from the voice input mode.

It is understood from the above description that, since in the embodiment of this application, a technical solution in which the selection operation is carried out through a first input mode different from the voice input mode is adopted, and it achieves a technical effect of increasing accuracy and velocity of the selection operation.

The second kind is the deciding chip being specifically for:

Deciding whether the user stops talking to obtain another result of decision;

Wherein, when the another result of decision indicates that the user stops talking, the first control instruction is generated, and when it indicates that the user does not stop talking, the first control instruction is not generated.

In the specific implementation procedure, when the user has already stopped talking, no matter whether the user selects the first result of analysis, since the procedure of the voice input is ended, the first control instruction is generated and detecting the voice information is stopped.

It is understood from the above description that, since in the embodiment of this application, detecting voice information of the user is stopped when there is the first control instruction for stopping detecting whether the user is talking, it achieves a technical effect of saving power consumption for detecting and analyzing the voice information.

Since the electronic apparatus described by the third embodiment of this application is the electronic apparatus adopted by implementing the method of voice recognition of the first embodiment of this application, so based on the method of voice recognition described in the first embodiment of this application, those skilled in the art can understand the specific implementation modes and the various variations of the electronic apparatus in the present third embodiment, so the electronic apparatus is no longer described detailed here. Once the electronic apparatus implementing the method of voice recognition in the first embodiment of this application is adopted by those skilled in the art, it all falls into the scope sought for protection of this application.

One or more technical solutions provided by the embodiments of this application at least have the following technical effects or advantages:

(1) Since in the embodiments of this application, the technical solution in which when the electronic apparatus detects that the user starts to talk, partial voice information corresponding to voice information with integral semantic of the user is detected and the partial voice information is analyzed to obtain M results of analysis is adopted, because there is no need to acquire voice information with integral semantic to analyze the voice information, it solves the technical problem that the recognition of the voice information is not in time adequately in the prior art, and achieves a technical effect of recognizing the voice information in time.

(2) Since in the embodiments of this application, detecting voice information of the user is stopped when there is the first control instruction for stopping detecting whether the user is talking, it achieves a technical effect of saving power consumption for detecting and analyzing the voice information.

(3) Since in the embodiments of this application, it determines whether to generate the first control instruction by deciding whether there is the selection operation selecting a first processing object in M processing objects of the user, and generally, after the user selects the first processing object, it indicates that the electronic apparatus has already recognized the control instruction needed by the user, thus, detecting the voice information is stopped in this case, which achieves a technical effect of saving power consumption while recognizing the voice information accurately.

(4) Since in the embodiments of this application, technical solution in which the M results of analysis are scored and the M1 results of analysis with the highest point values are displayed is adopted, wherein higher point value indicates that the match degree is relatively high in general situations, thus, it achieves a technical effect of increasing accuracy of the voice recognition.

(5) Since in the embodiments of this application, a technical solution in which the selection operation is carried out through a first input mode different from the voice input mode is adopted, it achieves a technical effect of increasing accuracy and velocity of the selection operation.

It is obvious that those skilled in the art can make various modifications and variations to the present application without departing from the spirit and scope of the present application. Thus, if these modifications and variations of the present application fall within the scope of the claims of the present application and the equivalent technology, the present application is intended to comprise these modifications and variations.

The invention claimed is:

1. A method of voice recognition applied in an electronic apparatus comprising:
   when the electronic apparatus detects that a user starts to speak at a first moment, detecting by a microphone, a first voice sub-information at a second moment while a same user is speaking until a third moment, wherein the first voice sub-information includes voice information from the first moment to the second moment spoken by the same user, the first voice sub-information is partial voice information of voice information with integral semantic from the first moment to the third moment spoken by the same user, and
   analyzing by a processor of the electronic apparatus the first voice sub-information to obtain a plurality of results of analysis while the same user is speaking,
   displaying a part or all of the plurality of results of analysis on a display interface to receive a selection instruction of the user; and
   deciding whether there is a first control instruction for stopping detecting whether the user is speaking;
   detecting, by the microphone, a second voice sub-information at a fourth moment after the second moment when there is no first control instruction, wherein the second voice sub-information includes voice information from the first moment to the fourth moment spoken by the same user; and
   analyzing, by the processor of the electronic apparatus, the second voice sub-information to obtain a plurality of results of analysis while the same user is speaking, the second voice sub-information comprising the first voice sub-information.

2. The method according to claim 1, wherein analyzing the first voice sub-information to obtain the plurality of results of analysis comprises analyzing the first voice sub-information to obtain a plurality of keyword text information, the plurality of keyword text information being exactly the plurality of results of analysis.

3. The method according to claim 1, wherein analyzing the first voice sub-information to obtain the plurality of results of analysis comprises:
   analyzing the first voice sub-information to obtain a second plurality of keyword text information, and
   obtaining the plurality of results of matching whose match degree with any of the second plurality of keyword text information is larger than a first preset threshold based on the second plurality of keyword text information, the plurality of results of matching being exactly the plurality of results of analysis.

4. The method according to claim 1, wherein after analyzing the first voice sub-information to obtain the plurality of results of analysis, the method further comprises:
   stopping detecting whether the user is speaking when there is the first control instruction.

5. The method according to claim 4, wherein deciding whether there is the first control instruction for stopping detecting whether the user is speaking further comprises deciding whether there is a selection operation of selecting a first result of analysis in a third plurality of results of analysis to obtain a decision result, wherein when the result of decision indicates that there is the selection operation, the first control instruction is generated.

6. The method according to claim 5, wherein the selection operation comprises an operation carried out through a first input mode, the first input mode being an input mode different from a voice input mode.

7. The method according to claim 5, wherein before displaying the third plurality of results of analysis in the plurality of results of analysis on the display interface, the method further comprises:
   scoring the plurality of results of analysis according to the match degree to obtain a plurality of first point value; or
   scoring the plurality of results of analysis according to the historical selection information to obtain a plurality of second point values; or
   scoring the plurality of results of analysis according to the match degree and the historical selection information to obtain a plurality of third point values.

8. The method according to claim 7, wherein before displaying the second plurality of results of analysis in the plurality of results of analysis on the display interface, the method further comprises:
   acquiring the second plurality of results of analysis having the highest point value among the first point values, the second point values or the third point values from the plurality of results of analysis; and
   displaying the second plurality of results of analysis on the display interface.

9. The method according to claim 1, wherein analyzing the first voice sub-information to obtain the plurality of results of analysis comprises carrying out voiceprint analysis to the first voice sub-information to obtain the plurality of results of analysis.

10. An electronic apparatus comprising:
    a detecting chip for when the electronic apparatus detects that a user starts to speak at a first moment, detecting a first voice sub-information at a second moment by a microphone while the same user is speaking until a third moment, wherein the first voice sub-information includes voice information from the first moment to the second moment spoken by the same user, the first voice sub-information is partial voice information of voice information with integral semantic from the first moment to the third moment spoken by the same user
    an analyzing chip for analyzing the first voice sub-information to obtain a plurality of results of analysis while the same user is speaking
    a displaying chip for displaying a part or all of the plurality of results of analysis on a display interface to receive a selection instruction of the user; and
    a deciding chip for deciding whether there is a first control instruction for stopping detecting whether the user is speaking;
    wherein the detecting chip detecting a second voice sub-information at a fourth moment after the second moment when there is no first control instruction, wherein the second voice sub-information includes voice information from the first moment to the fourth moment spoken by the same user; and
    the analyzing chip analyzing the second voice sub-information to obtain a plurality of results of analysis while the same user is speaking, the second voice sub-information comprising the first voice sub-information.

11. The electronic apparatus according to claim 10, wherein the analyzing chip comprises analyzing the first voice sub-information to obtain a plurality of keyword text information, the plurality of keyword text information being exactly the plurality of results of analysis.

12. The electronic apparatus according to claim 10, wherein the analyzing chip comprises:
   an analyzing sub-chip for analyzing the first voice sub-information to obtain a second plurality of keyword text information; and
   a matching sub-chip for obtaining the plurality of results of matching whose match degree with any of the second plurality of keyword text information is larger than a first preset threshold based on the second plurality of keyword text information, the plurality of results of matching being exactly the plurality of results of analysis.

13. The electronic apparatus according to claim 10, wherein the electronic apparatus further comprises:
   a stopping chip for stopping detecting whether the user is speaking when there is the first control instruction.

14. The electronic apparatus according to claim 13, wherein the deciding chip comprises:
   a deciding sub-chip for deciding whether there is a selection operation of selecting a first result of analysis in a second plurality of results of analysis to obtain a result of decision; and
   a generating sub-chip for generating the first control instruction when the result of decision indicates that there is the selection operation.

15. The electronic apparatus according to claim 14, wherein the selection operation includes an operation carried out through a first input mode, the first input mode being an input mode different from a voice input mode.

16. The electronic apparatus according to claim 10, wherein the electronic apparatus further comprises:
   a scoring chip for scoring the plurality of results of analysis according to match degree to obtain a plurality of first point values before displaying the second plurality of results of analysis in the plurality of results of analysis on the display interface; or
   scoring the plurality of results of analysis according to historical selection information to obtain a plurality of second point values; or
   scoring the plurality of results of analysis according to the match degree and historical selection information to obtain a plurality of third point values.

17. The electronic apparatus according to claim 16, wherein the display chip comprises:
   an acquiring sub-chip for acquiring the plurality of results of analysis having the highest point value among the first point values, the second point values or the third point values from the plurality of results of analysis; and
   a displaying sub-chip for displaying the second plurality of results of analysis on the display interface.

18. The electronic apparatus according to claim 10, wherein the analyzing chip comprises carrying out voice-print analysis to the first voice sub-information to obtain the plurality of results of analysis.

* * * * *